(12) United States Patent
Futch et al.

(10) Patent No.: US 12,741,829 B2
(45) Date of Patent: Sep. 22, 2026

(54) VEHICLE AND MATERIAL HANDLER

(71) Applicant: Tompkins Robotics, Inc., Orlando, FL (US)

(72) Inventors: Michael C. Futch, Cocoa, FL (US); James M. Serstad, Orlando, FL (US)

(73) Assignee: TOMPKINS ROBOTICS, INC., Orlando, FL (US)

( * ) Notice: Subject to any disclaimer, the term of this patent is extended or adjusted under 35 U.S.C. 154(b) by 0 days.

(21) Appl. No.: 19/175,526

(22) Filed: Apr. 10, 2025

(65) Prior Publication Data

US 2025/0236471 A1 Jul. 24, 2025

Related U.S. Application Data

(63) Continuation of application No. 18/444,098, filed on Feb. 16, 2024, now Pat. No. 12,291,409, which is a continuation of application No. 17/306,587, filed on May 3, 2021, now Pat. No. 11,912,514, which is a continuation of application No. PCT/US2019/064353, filed on Dec. 4, 2019.

(60) Provisional application No. 62/776,001, filed on Dec. 6, 2018.

(51) Int. Cl.

*B65G 47/94* (2006.01)
*B65G 1/04* (2006.01)
*B65G 47/96* (2006.01)

(52) U.S. Cl.

CPC ......... *B65G 47/962* (2013.01); *B65G 1/0492* (2013.01); *B65G 2201/02* (2013.01)

(58) Field of Classification Search

CPC .... B65G 47/94; B65G 47/962; B65G 1/0492; B65G 1/04; B65G 1/08; B65G 1/137; B65G 2201/02; B65G 63/00; B25J 5/00

USPC .................................................... 198/370.04

See application file for complete search history.

(56) References Cited

U.S. PATENT DOCUMENTS 4,993,535 A 2/1991 Scata
5,513,936 A 5/1996 Dean
6,234,297 B1 5/2001 Blanc
6,374,983 B1 4/2002 Morigi
6,460,681 B1 10/2002 Coutant et al.
7,212,884 B2 5/2007 Kappelgaar et al.
7,341,140 B1 3/2008 Warkentin
8,727,103 B2 5/2014 Vitalini (Continued)

FOREIGN PATENT DOCUMENTS

JP 11334819 A 12/1999
SU 908701 A1 2/1982
SU 1567459 A1 5/1990

OTHER PUBLICATIONS

ISA/RU; International Search Report and Written Opinion for International Patent Application No. PCT/US19/64353 dated Mar. 12, 2020, 10 pages.

(Continued)

*Primary Examiner* — Leslie A Nicholson, III

(74) *Attorney, Agent, or Firm* — Parthiban A Mathavan

(57) ABSTRACT

Robot includes a propulsion system configured to transport the robot and a controller in communication with the propulsion system. A material handler is carried by the robot and configured for depositing articles into one or more destination containers. The material handler has a tilt tray having sections that are configured for tilting in any number of directions relative to a vertical of the robot. Each section of the tilt tray may include a respective conveyor that moves articles at variable speed.

17 Claims, 4 Drawing Sheets

(56) References Cited

U.S. PATENT DOCUMENTS

| | | | |
|---|---|---|---|
| 8,851,267 | B2 | 10/2014 | Sotelo et al. |
| 2003/0121760 | A1 | 7/2003 | Forrest |
| 2005/0095094 | A1 | 5/2005 | Maynard et al. |
| 2018/0273297 | A1 | 9/2018 | Wagner et al. |
| 2021/0268951 | A1 | 9/2021 | Futch et al. |

OTHER PUBLICATIONS

WIPO, International Preliminary Report on Patentability for PCT Patent Application No. PCT/US2019/064353 dated Jun. 8, 2021, 6 pages.

VEHICLE AND MATERIAL HANDLER

CROSS-REFERENCE TO RELATED APPLICATIONS

This application is a continuation of U.S. patent application Ser. No. 17/306,587, filed on May 3, 2021, which claims priority to International Application No. PCT/US2019/064353 filed Dec. 4, 2019, which claims priority to U.S. Provisional Patent Application No. 62/776,001, filed on Dec. 6, 2018, the entire contents of which are incorporated by reference herein.

TECHNICAL FIELD

The present disclosure relates generally to material handlers for transporting and delivering articles, and more particularly to a material handler with a sectioned and/or tilt tray.

BACKGROUND

Products and parcels are increasingly prepared and routed through handling facilities where efficiency and flexibility are needed while the good condition of each processed item must be maintained. Items across wide ranges of weight and size may be passed through a single facility. For example, runs of products having similar or same weight and size may be handled by equipment that is later used to process entirely other products with regard to mass and dimensions. In other examples, a processing or shipping facility may have a handling line of equipment across which products pass having weights and dimensions that vary from item to item in real time.

Some products are fragile, and others have more robust structures than the packaging around them. In any case, each product needs to be sorted to an order and each parcel needs to reach its destination with both the packaging and product intact. Tilt and belt systems for moving and conveying items are often of single-product type design or require significant reconfiguration for use with each different product type, and often times such systems are entirely unsuitable for handling special items such as breakable items, crushable items, very small items or very light items.

SUMMARY

This summary is provided to introduce in a simplified form concepts that are further described in the following detailed descriptions. This summary is not intended to identify key features or essential features of the claimed subject matter, nor is it to be construed as limiting the scope of the claimed subject matter.

In at least one embodiment, a robot includes: a propulsion system configured to transport the robot; a controller in communication with the propulsion system; a material handler carried by the robot and configured for depositing articles into one or more destination containers, the material handler having a tilt tray that is configured for tilting relative to a vertical of the robot, the tilt tray having at least a first section configured for tilting in a first direction to deposit a first article carried by the material handler, and a second section configured for tilting in the first direction or in a second direction to deposit a second article carried by the material handler.

The first section of the tilt tray may be configured to tilt in a first direction relative to the vertical of the robot; and the second section of the tilt tray may be configured to tilt in a second direction at least partially opposite the first direction relative to the vertical of the robot. The tilt tray sections can also be configured to tilt in a same tilt direction.

The material handler may be in communication with the controller to adjust a respective angle of each section of the tilt tray relative to the vertical of the robot.

At least one of the first section and second section of the tilt tray may include a conveyor that moves relative to a plate portion of the tilt tray section.

The conveyor may include a moving belt.

The controller may adjust a speed of the moving belt according to product specifications of an article moved by the belt.

The controller may be configured to adjust, with regard to the tilt of each tray section, the tilt speed, tilt angle, and acceleration of tilt so that for example each tray section can gently lift a fragile product by starting slow and accelerating the tilt. The acceleration of tilt can be increased for example so that a tray section tilts in a sudden manner to dislodge an item prone to sticking due to friction or static electricity. The controller can adjust the travel speed of an article moving down either of the first and second section of the tilt tray for example by controlling the speed of a conveyor such as a belt.

The controller may be configured to adjust the tilt speed, tilt angle, and travel speed of the article according to a weight of the article.

The controller may be configured to adjust the tilt speed, tilt angle, acceleration of tilt, and travel speed of the article according to a dimension of the article.

The controller may be configured to adjust the tilt speed, tilt angle, acceleration of tilt, and travel speed of the article according to the fragility of the article.

The controller may be configured to adjust the tilt speed, tilt angle, acceleration of tilt, and travel speed of the article according to the fragility of the article The controller may be in communication with a scale or dimensioning device which interacts with the product and, based upon the measured weight or volume, may send instructions to the material handler regarding the appropriate tilt speed, tilt angle, acceleration of tilt, and travel speed of the article.

The controller may access a master list of products which contains information about each product's volume, weight and special handling requirements and, based upon the information, may send instructions to the material handler regarding the appropriate tilt speed, tilt angle, acceleration of tilt, and travel speed of the article.

The controller may be configured to direct the robot to autonomously deliver articles to respective specified destination containers.

Although two tilt tray sections are illustrated and described in detail in the following, the vehicle may have any number of tilt tray sections. The tilt tray sections may tilt each in a direction distinct from the others, or they may tilt all in the same direction. For example, a subset of the tilt tray sections may tilt in one direction, and another subset of the tilt tray sections may tilt in a different or opposite direction. Any number of tilt tray sections tilting in any number of directions are within the scope of these directions.

In various embodiments, a vehicle configured for carrying and delivering items can have a sectioned tray and/or variable tilt features. For example, a vehicle within the scope of these descriptions can have a variable tilt tray with one section, two sections, or any number of sections. Also a vehicle within the scope of these descriptions can any number of sections, including only one section or more, and may or may not have tilt features such as variable tilting independently for each section, or the multiple sections, where more than one are present, may tilt together.

BRIEF DESCRIPTION OF THE DRAWINGS

The previous summary and the following detailed descriptions are to be read in view of the drawings, which illustrate particular exemplary embodiments and features as briefly described below. The summary and detailed descriptions, however, are not limited to only those embodiments and features explicitly illustrated.

DETAILED DESCRIPTIONS

Figure 1:
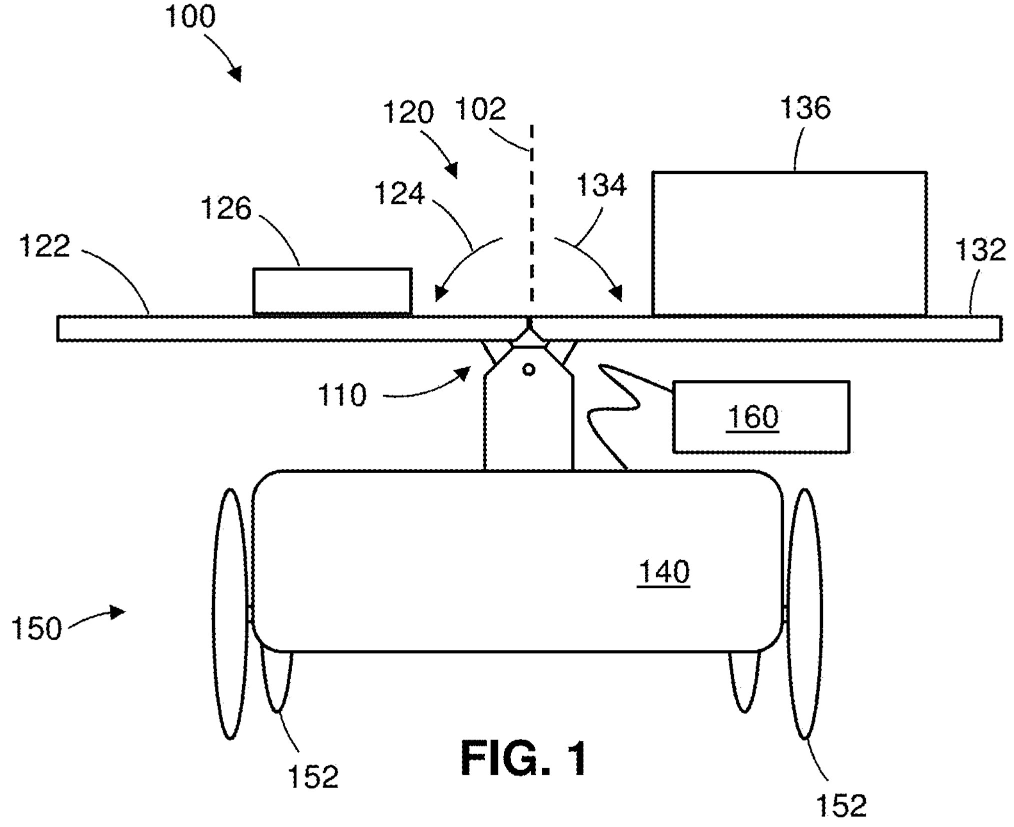
FIG. 1 is an elevation view of a vehicle having a multiple section tilt tray material handler according to at least one embodiment.

These descriptions are presented with sufficient details to provide an understanding of one or more particular embodiments of broader inventive subject matters. These descriptions expound upon and exemplify particular features of those particular embodiments without limiting the inventive subject matters to the explicitly described embodiments and features. Considerations in view of these descriptions will likely give rise to additional and similar embodiments and features without departing from the scope of the inventive subject matters. Although the term "step" may be expressly used or implied relating to features of processes or methods, no implication is made of any particular order or sequence among such expressed or implied steps unless an order or sequence is explicitly stated.

Any dimensions expressed or implied in the drawings and these descriptions are provided for exemplary purposes. Thus, not all embodiments within the scope of the drawings and these descriptions are made according to such exemplary dimensions. The drawings are not made necessarily to scale. Thus, not all embodiments within the scope of the drawings and these descriptions are made according to the apparent scale of the drawings with regard to relative dimensions in the drawings. However, for each drawing, at least one embodiment is made according to the apparent relative scale of the drawing.

Like reference numbers used throughout the drawings depict like or similar elements. Unless described or implied as exclusive alternatives, features throughout the drawings and descriptions should be taken as cumulative, such that features expressly associated with some particular embodiments can be combined with other embodiments.

Figure 2:
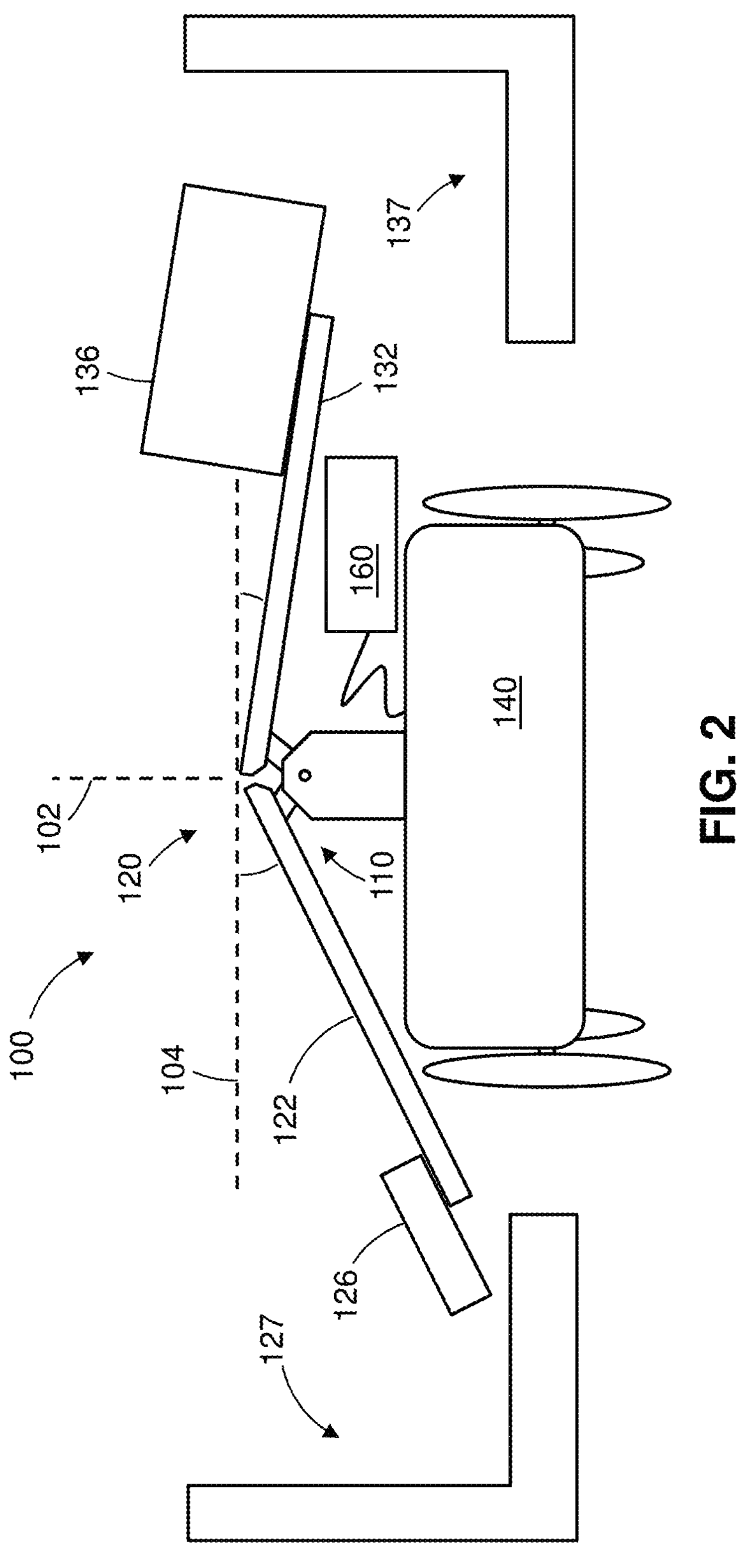
FIG. 2 is an elevation view of the vehicle of FIG. 1 with the sections of the tilt tray lowered in different directions.

A vehicle 100, according to at least one embodiment is illustrated in FIG. 1, carries a material handler 110 configured for delivering articles to a destination, for example depositing articles into containers. As shown in FIG. 2, the material handler 110 may include a tilt tray 120 configured for tilting in multiple directions relative to a vertical 102 of the vehicle. Operational control of the vehicle may be semi or essentially entirely autonomous. Thus human operator control or monitoring can vary in different embodiments and the vehicle 100 can be described as a robot, as robotic, or as a component in a robotic system.

The tilt tray 120 may have a first section 122 configured for tilting in a first direction 124 to deposit a first article 126 carried by the material handler into a container 127, and a second section 132 configured for tilting in a second direction 134 to deposit a second article 136 carried by the material handler into a second container 137. Although two tilt tray sections are explicitly illustrated, the vehicle may have any number of tilt tray sections tilting in any number of directions.

The vehicle 100 may have a main body 140 that carries the material handler 110 and propulsion system 150 for moving the main body 140 and material handler 110 therewith. The propulsion system 150 is represented in FIGS. 1-2 by way of transport wheels 152 rotatably mounted on the main body 140. In other examples, the material handler 110 may be carried by other conveyors, transport systems, or motion producing devices.

Figure 4:
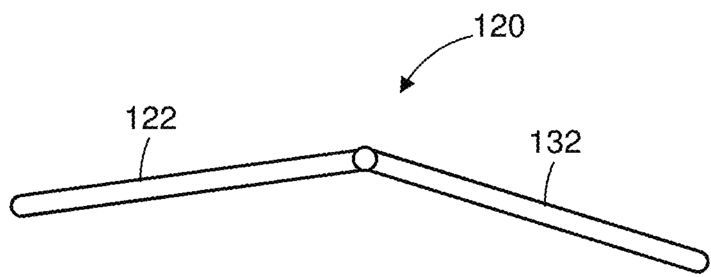
FIG. 4 is an illustration of the tilt tray sections mounted to converge on a common axis according to at least one embodiment.

The vehicle 100 may include a respective tilt motor or other adjuster coupled to each section 122 and 132 of the tilt tray 120 for independent tilt control of the sections. Thus, each of the first section 122 and second section 132 can be positioned, for example tilted below the horizontal 104. The vehicle may include a controller 160 in wired, wireless, or mechanical communication with each of the tilt motors or adjusters that govern the tilt angles of the sections 122 and 132 of the tilt tray 120. The tilt tray sections 122 and 132 are shown in FIGS. 1 and 2 as independently hingedly mounted upon the material handler 110. In other embodiments, for example as represented in FIG. 4, the upper ends of the tilt tray sections 122 and 132 converge to a common hinging axis.

Figure 3:
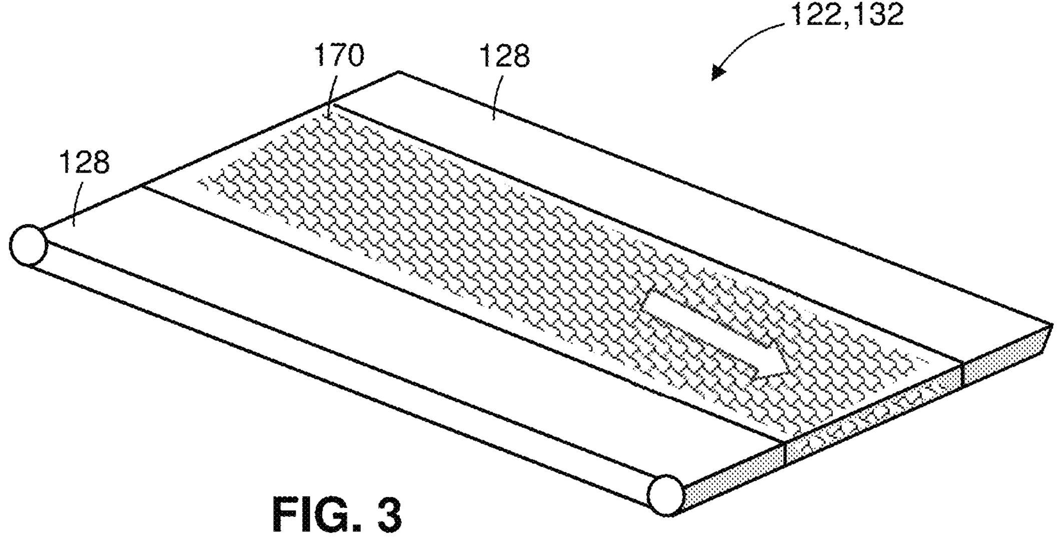
FIG. 3 is a perspective view of either tilt tray section of FIGS. 1 and 2 shown with a conveyor according to at least one embodiment.

As further shown in FIG. 3, each tilt tray section 122 and 132 may have a respective conveyor 170 that moves relative to plate portions 128 of the tilt tray section. For example the conveyor can be a belt having traction with any item placed on the tray section 122 or 132. Thus the travel speed of an item moving down the tray section 122 or 132 can be controlled by adjustment of the speed of the conveyor 170.

For example, the controller 160 may provide functionality to adjust the tilt speed, acceleration of tilt, tilt angle and travel speed of an item moving down the tray section 122 or 132 according to the characteristics of the item on the tray. For example, when a product is associated with the vehicle 100, the handling requirements are sent to the controller or a memory in communication with the controller 160 so that the vehicle can uniquely handle fragile items, extremely lightweight items, heavy items, etc.

For example, a product can be scanned and barcode information of the product can be sent to the controller 160 directly or via a facility control system, which may assign or determine special handling characteristic of that product. Routing information can be included so as to move each product to an intended location where motion and angle parameters of the vehicle and tilt tray sections 122 and 132 are adjusted according to the products carried.

The handling characteristics may be determined by the controller via a database the contains each product's weight, volume or special handling requirements.

The handling characteristics of each product may be determined by the controller which is in communication with a scale or dimensioning device based up the product's weight or volume.

Sensors in communication with the vehicle, for example in feedback and control communication with the controller 160, may be used. For example, the destination containers may have sensors to detect the speed, acceleration, or forces of or acting on descending items or the vehicle 100. Delivery parameters such as tilt speed, tilt angle, acceleration of tilt, and travel speed of an item moving down the tray section 122 or 132 may be changed according to how full a destination container has become with other products so as to adjust for drops from the tray sections from various relative heights.

Figure 5:
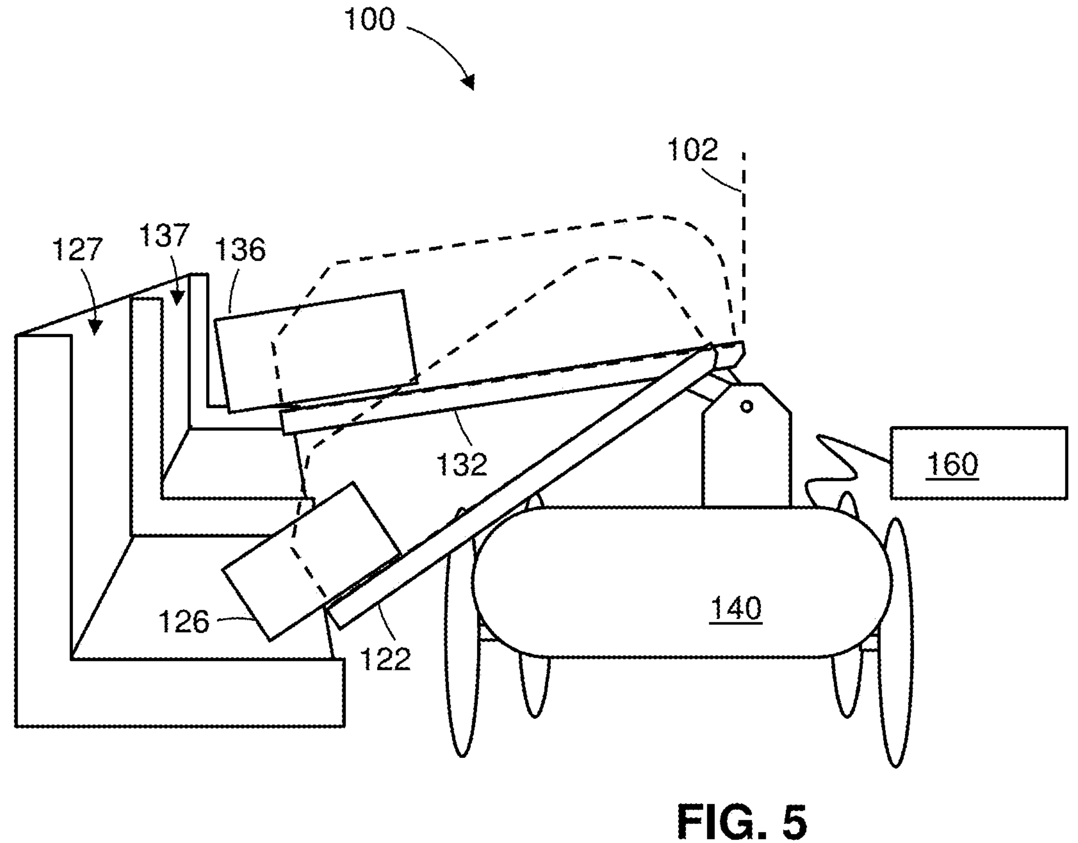
FIG. 5 illustrates another embodiment of the vehicle in which the tilt tray sections tilt independently in a same tilt direction and are arranged in side-by-side fashion.

FIG. 5 illustrates another embodiment of the vehicle 100, in which the tilt tray sections 122 and 132 tilt independently a same tilt direction relative to the a vertical 102 of the vehicle. In FIG. 5, the tray sections 122 and 132 are shown as tilting to the left of the vehicle, but the tray sections can be arranged to tilt in any direction in various embodiments. The tilt tray sections 122 and 132 can be arranged on the vehicle 100 in side-by-side relation as shown so that the first section 122 can tilt to deposit a first article 126 into a bin container 127 and the second section 132 can tilt to deposit a second article 136 into a separate bin container 137.

Each tray section 122 and 132 is shown in FIG. 5 with a respective sidewall in dashed line representing that the tray sections in some embodiments are walled, for example on three sides, and are open in the direction of the containers to which they deliver items.

Particular embodiments and features have been described with reference to the drawings. It is to be understood that these descriptions are not limited to any single embodiment or any particular set of features, and that similar embodiments and features may arise or modifications and additions may be made without departing from the scope of these descriptions and the spirit of the appended claims.

An example of the application of this invention is in an order processing facility which has a variety of products including apparel, cosmetics and household goods. Some of these products might be extremely lightweight such as small silk scarves. When the system scans the barcode of a small silk scarf, the controller will send instructions to the material handler to tilt the tray with maximum tilt speed, tilt acceleration and tilt angle to ensure that static electricity does not prevent the item from falling into the destination container. When the system scans the barcode of a small cosmetic item, the controller will send instructions to the robot to deliver the item to a location with a small destination container appropriately sized for cosmetic orders. When the system scans the barcode of a glass candle, the controller will first send instruction to the robot to carry the item to a location with a shallow chute specially designed to receive such breakable items, then will instruct the tilt tray to tilt slowly and with a shallow angle.

What is claimed is:

1. A robotic material handling system comprising:

a vehicle with transport wheels rotatably mounted thereon, the vehicle comprising a material handler with a tilt tray having a first section configured for tilting at a first angle relative to a vertical of the vehicle to deposit a first article carried on a top surface of the first section, and a second section configured for tilting at a second angle different from the first angle relative to the vertical of the vehicle to deposit a second article carried on a top surface of the second section; and a wireless controller configured to direct the vehicle to autonomously deliver the first article to a destination container, wherein the wireless controller is further configured to send instructions to the material handler to adjust a delivery parameter of the first article, wherein the wireless controller is further configured to access information on an article master list, wherein the instructions sent to the material handler are based on the information on the article master list.

2. The system of claim 1, wherein the information on the article master list comprises one or more of a: volume, weight, and handling requirement for a plurality of articles.

3. The system of claim 1, wherein the wireless controller is further configured to adjust the delivery parameter by adjusting a drop height of a section of the tilt tray.

4. The system of claim 1, wherein at least one of the first section and second section of the tilt tray comprises a conveyor that moves relative to a plate portion of the tilt tray section.

5. The system of claim 4, wherein the wireless controller is further configured to adjust the delivery parameter by adjusting a speed of a moving belt of the conveyor according to product specifications of an article moved by the conveyor.

6. The system of claim 4, wherein a travel speed of an article moving down the first section or the second section of the tilt tray is controlled by adjusting a speed of the conveyor.

7. The system of claim 4, wherein a tilt angle of each section of the tilt tray relative to the vertical of the vehicle is not adjusted during the deposit of the first article and the second article such that a conveyor moving relative to the plate portion of the tilt tray section causes the deposit of the first article and the second article.

8. The system of claim 1, wherein the wireless controller is further configured to adjust the delivery parameter by adjusting a motion parameter of a tilt tray section.

9. The system of claim 1, wherein the wireless controller is further configured to adjust the delivery parameter according to a fragility of the article.

10. The system of claim 1, wherein the first section of the tilt tray is set at the first angle for depositing the first article.

11. The system of claim 1, wherein the second section of the tilt tray is set at the first angle for depositing the second article.

12. The system of claim 1, wherein the first section of the tilt tray deposits the first article in the destination container; and, the second section of the tilt tray deposits the second article in one of: the destination container, and a second destination container.

13. The system of claim 1, wherein adjusting the delivery parameter comprises adjusting one or more of a: tilt speed, tilt angle, acceleration of tilt, and travel speed of an article moving down either of the first and second section of the tilt tray.

14. The system of claim 1, wherein adjusting the delivery parameter comprises adjusting one or more of a: tilt speed, tilt angle, acceleration of tilt, and travel speed of the article according to a characteristic of the article.

15. The system of claim 14 wherein the characteristic of the article comprises: a weight, a volume, or a specific handling requirement of an article.

16. The system of claim 1, wherein the delivery parameter is adjusted based on how full the destination container is with previously delivered articles.

17. The system of claim 1, wherein the first section of the tilt tray and the second section of the tilt tray are further configured to tilt in a same direction relative to the vertical of the vehicle.

* * * * *